United States Patent
Girodet et al.

(10) Patent No.: US 7,947,228 B2
(45) Date of Patent: May 24, 2011

(54) DEVICE FOR DISINFECTING WATER BY MEANS OF ULTRAVIOLET RADIATION

(75) Inventors: Pierre Girodet, Asnières-sur-Siene (FR); Christian Vanpeene, Villejuif (FR)

(73) Assignee: OTV SA, Saint Maurice Cedex (FR)

( * ) Notice: Subject to any disclaimer, the term of this patent is extended or adjusted under 35 U.S.C. 154(b) by 990 days.

(21) Appl. No.: 10/559,308

(22) PCT Filed: May 17, 2004

(86) PCT No.: PCT/FR2004/001217
§ 371 (c)(1),
(2), (4) Date: Jul. 6, 2007

(87) PCT Pub. No.: WO2004/108604
PCT Pub. Date: Dec. 16, 2004

(65) Prior Publication Data
US 2008/0031771 A1    Feb. 7, 2008

(30) Foreign Application Priority Data
Jun. 2, 2003    (FR) ...................................... 03 06638

(51) Int. Cl.
*A62B 7/08*     (2006.01)
*A61L 2/00*     (2006.01)
*G01N 21/01*    (2006.01)
*G01N 21/51*    (2006.01)
*G01N 23/10*    (2006.01)
*G01N 23/12*    (2006.01)

(52) U.S. Cl. ............ 422/121; 422/120; 422/22; 422/24; 250/431; 250/432 R; 250/436

(58) Field of Classification Search .................. 250/431, 250/436, 432 R; 422/120, 121, 24; 210/748.01, 210/748.2
See application file for complete search history.

(56) References Cited

U.S. PATENT DOCUMENTS

| | | | |
|---|---|---|---|
| 4,367,410 A * | 1/1983 | Wood | ............................ 250/431 |
| 5,937,266 A | 8/1999 | Kadoya | |
| 6,231,820 B1 | 5/2001 | Wedekamp | |
| 6,342,188 B1 | 1/2002 | Hesse | |

FOREIGN PATENT DOCUMENTS

| | | |
|---|---|---|
| DE | 19957073 | 5/2001 |
| NL | 1013864 | 6/2001 |
| WO | WO 00/51943 | 9/2000 |

* cited by examiner

*Primary Examiner* — Sean Conley
*Assistant Examiner* — Regina Yoo
(74) *Attorney, Agent, or Firm* — Coats & Bennett, P.L.L.C.

(57) ABSTRACT

An ultraviolet wastewater or water treatment system is described and comprises a plurality of ultraviolet lamps where each lamp includes a protective cladding and where the ultraviolet lamps are disposed in vertical modules that form a bank of ultraviolet lamps. A series of beams are disposed over the ultraviolet lamps with each beam supporting a carriage thereon. Each carriage supports a scraper that extends downwardly therefrom for engaging and cleaning a module of ultraviolet lamps. A common drive source is operatively connected to the respective carriages for driving the carriages back and forth on the respective beams such that as the common drive source drives the carriages back and forth, the respective scrapers move back and forth cleaning the protective cladding extending around the respective ultraviolet lamps.

8 Claims, 2 Drawing Sheets

DEVICE FOR DISINFECTING WATER BY MEANS OF ULTRAVIOLET RADIATION

This application is a U.S. National Stage application of PCT Application No. PCT/FR04/01217, with an international filing date of May 17, 2004. Applicant claims priority based on French application serial no. 03 06638 filed Jun. 2, 2003.

The invention relates to the domain of water treatment for disinfecting purposes, both for purification processes and for drinking water treatment processes.

More precisely, the invention relates to ultraviolet radiation water disinfecting in an open channel.

With this technique, the water to be disinfected passes through the upper part of an open channel inside which one or several banks of lamps are arranged applying ultraviolet radiation at a wavelength of between 180 nm and 400 nm.

These banks are composed of several modules mounted parallel to each other, each module comprising one or several vertical series of UV lamps protected by quartz claddings and arranged along the flow direction of the water to be disinfected in the channel, a beam and support means connecting the lamps to this beam.

These banks of UV lamps are arranged in the channel such that all lamps are immersed in water passing through the channel. Each module is held in position by a beam provided with supports holding the lamps in their cladding transparent to UV.

The lamps are arranged such that their longitudinal axis is essentially parallel to the direction of water flow in the channel such that water is in contact with the disinfecting radiation for as long as possible. The water disinfecting channels are thus equipped with several banks of lamps arranged in the channel one after the other.

This ultraviolet radiation disinfecting technique in an open channel has existed for about twenty years. The power of UV lamps has been increasing as the technique evolved, particularly due to the technology of low pressure UV lamps, by which each lamp bank can treat an increasingly larger quantity of water.

Particularly when the treated water consists of wastewater, a deposit with a varying magnitude is formed on the UV lamp protective claddings, gradually hindering transmission of ultraviolet radiation.

It is also frequent to equip ultraviolet radiation water disinfecting devices with means of cleaning these protective claddings.

These cleaning means consist of automated scrapers that perform a to-and-fro movement along the claddings.

At the present time, known solutions use an actuator (pneumatic or hydraulic) for each module. In other words, each bank comprises one actuator for each module.

Such a solution is expensive, in that a large number of actuators are necessary to obtain the required cleaning, and appropriate control means are necessary for all these actuators.

Furthermore, such a technique requires relatively long installation and possibly maintenance times.

Furthermore, actuators controlling the scrapers are provided on modules and thus increase their weight, consequently these modules are often difficult to manipulate.

In particular, one purpose of the invention is to overcome these disadvantages of prior art.

More precisely, the purpose of the invention is to propose an ultraviolet radiation water disinfecting device in which the means of cleaning the UV lamp protective claddings are less expensive and less complex than with prior art.

Another purpose of the invention is to provide such a device to significantly reduce installation times.

Another purpose of the invention is to supply such a device that facilitates and/or reduces maintenance.

Another purpose of the invention is to supply such a device with a power equivalent to the power of devices according to prior art.

Another purpose of the invention is to provide such a device in which the cleaning means are simple in design and easy to implement.

These and other purposes that will become clear later are achieved by the invention that relates to an ultraviolet radiation water disinfecting device designed to be installed in an open channel of an installation for disinfecting water by ultraviolet radiation, the said device including a plurality of longitudinal means forming UV lamps each composed of a UV lamp and a protective cladding made of a material transparent to UV and being distributed in a plurality of vertical modules forming a bank, each module being composed of a beam to which at least two means are fixed forming vertical supports holding at least one series of the said means forming lamps provided under the said beam one above the other, and at least one carriage mounted free to move in translation on each of the said beams, the said carriages carrying means of cleaning the said claddings, characterized in that the said device comprises common drive means for all of the said carriages not supported by the said modules.

Thus, unlike conventional solutions, the device according to the invention avoids the need to use a plurality of actuators each dedicated to one carriage, to actuate all cleaning means (scrapers). On the other hand, according to the invention, all cleaning means for a single bank are actuated by common means.

Consequently, significant time savings can be achieved for installation and for maintenance of scraper drive means.

Furthermore, since the modules do not support common drive means, they are much lighter and easier to handle than modules according to prior art each equipped with a carriage control actuator.

Finally, the cost of the device according to the invention is considerably reduced.

According to a first preferred embodiment, the said common drive means carry means of automatically attaching the said carriages
and/or the said carriages carry automatic means of attaching to the said common drive means.

The result is thus an advantageous device that provides a means of installing common drive means and carriages supporting the cleaning means, independently of each other, the parts being attached to each other automatically at the time of the first to-and-fro movement of the drive means.

Furthermore, if one of the carriages is detached from the drive means, the drive means will be able to attach once again to the carriage concerned at the next pass of the drive means.

Preferably, the said automatic attachment means are designed to detach when the said carriage and/or the said cleaning means transmit a predetermined resistance to translation of the said drive means.

Thus, if one of the carriages is blocked, the invention can be used for separating the blocked carriage while continuing to drive the other carriages.

Thus, the lamps and the claddings in the module with a blocked carriage are protected from breakage caused by the power of the cleaning means.

Such a blockage could for example arise due to an excessive accumulation of deposit forming on one of the protective claddings, the corresponding scraper then possibly stopping in contact with the accumulated deposit without being able to continue its displacement. Obviously, other blocking situations are possible, for example due to moving mechanical parts.

According to one advantageous solution, the said automatic attaching means include temporary connection systems, for example such as a spring, magnet, etc.

The result is thus an effective means with a simple design to perform the automatic attaching function.

The said connecting systems are preferably springs.

Such means are inexpensive, simple in design, and can be used easily and quickly. Furthermore, the structure and operation of such springs is such that they are not affected or only slightly affected by wear and therefore require no or almost no maintenance.

Furthermore, springs are particularly advantageous because they are capable of bending in a first direction at a small force to enable the carriages to be attached to the drive means, and they can also bend in a second direction opposite the first direction with a greater force than the force applied for attachment, to enable detachment of a carriage in a blocking situation like that mentioned above.

Preferably, the said springs extend from the said carriages, being convergent with each other towards the said common means for driving the set of carriages.

Such an arrangement provides automatic attaching and detaching functions regardless of the direction of displacement of the drive means with respect to the carriages.

According to one advantageous solution, the said common drive means include at least one electric actuator provided on at least one side of the said bank. However, other embodiments of these common drive means could be envisaged, once again not supported by the modules, for example using means such as pulley(s) and belt(s).

Preferably, the drive means include two actuators on each side of the said bank.

Preferably, the said actuator(s) carry(ies) at least one rod extending approximately perpendicular to the longitudinal axis of the said means forming lamps.

The rod in question may be very simple in design and have a constant cross-section designed to cooperate with each spring carried by the carriages.

According to one preferred variant, the travel distance of the said actuator(s) is greater than the length of the module beams. Thus, this rod can be brought beyond the modules to facilitate maintenance of the modules.

The invention also relates to a water disinfecting installation comprising at least one ultraviolet radiation water disinfecting device like that described above.

Other characteristics and advantages of the invention will become clearer after reading the following description of a preferred embodiment of the invention, given as an illustrative and non-limitative example and the attached drawings in which.

As mentioned above, the device according to the invention will be used to equip a water disinfecting installation including a concrete channel open at the upper part and through which water to be disinfected transits.

Remember that such a device consists of the association of several disinfecting modules arranged parallel to each other. Such an association of disinfecting modules is conventionally referred to as a "bank" by those skilled in the art.

Figure 1:
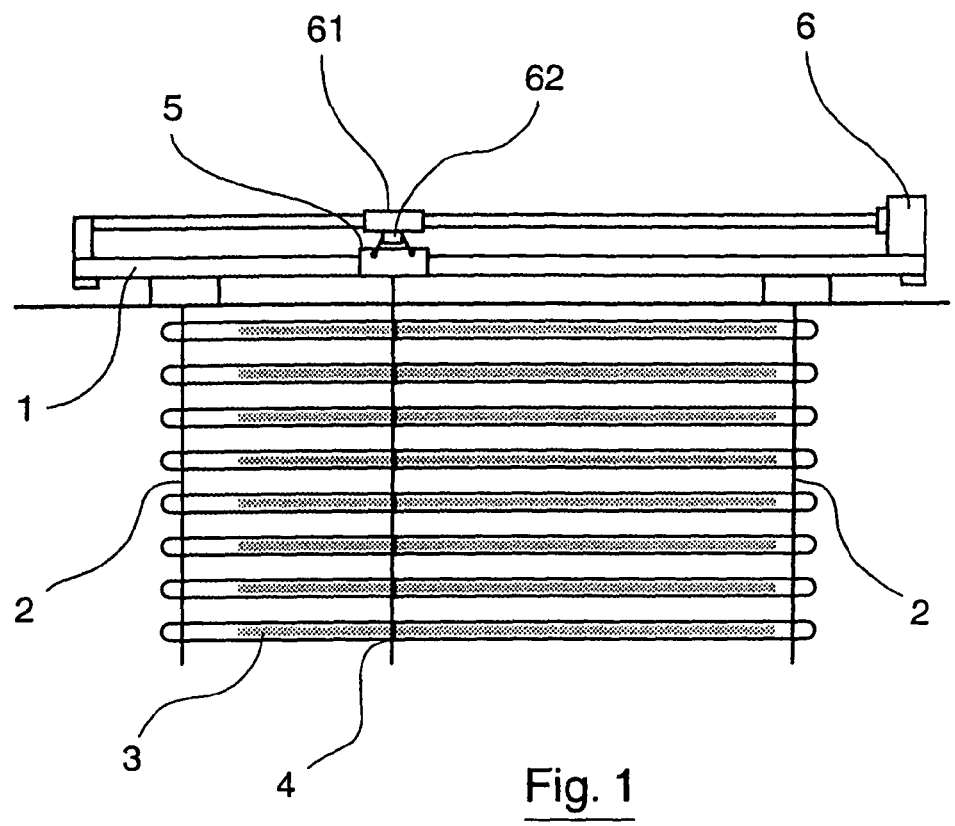
FIG. 1 shows a side view of a module in a bank in a disinfecting device according to the invention.

With reference to FIG. 1, each module is composed of a beam 1 to which supports 2 are connected (preferably two supports per beam) carrying two vertical series of means forming lamp 3 (note that "means forming lamp" refers to the assembly formed by the UV lamp, its protective cladding made of a material transparent to ultraviolet radiation, usually made of quartz, and a connector at one of their ends).

As illustrated in FIG. 1, each module also comprises scraper means 4 installed free to slide on the means forming lamp 3 along a travel distance corresponding to at least the length of the UV lamps, and on the beam 1 through a carriage 5.

According to the invention, the carriage 5 on each module can be moved along the beam 1 under the action of common drive means.

Figure 3:
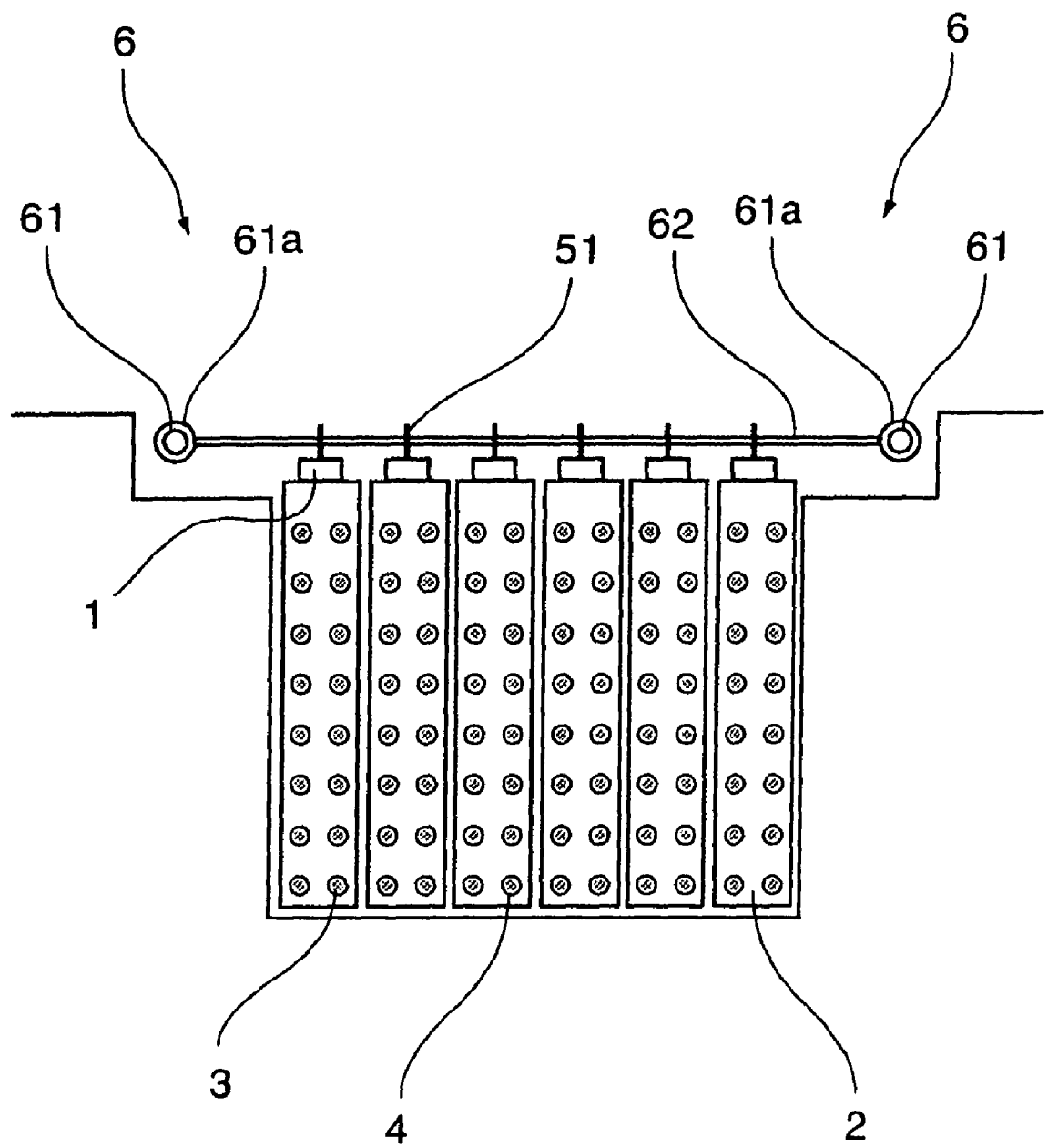
FIG. 3 is a sectional view of a channel receiving a bank of UV lamps distributed in modules and provided with common means for driving carriages not supported by the modules.

As can be seen in FIG. 3, these common drive means 6 comprise two actuators 61 on each side of the bank and therefore not supported by the modules and a transverse rod 62 connected to the mobile device 61a of these actuators 61. The transverse rod 62 extends approximately perpendicular from the means forming lamp 3, over the entire width of the corresponding bank. The drive means 6 drive carriages over the entire length of the lamp claddings.

Figure 2:
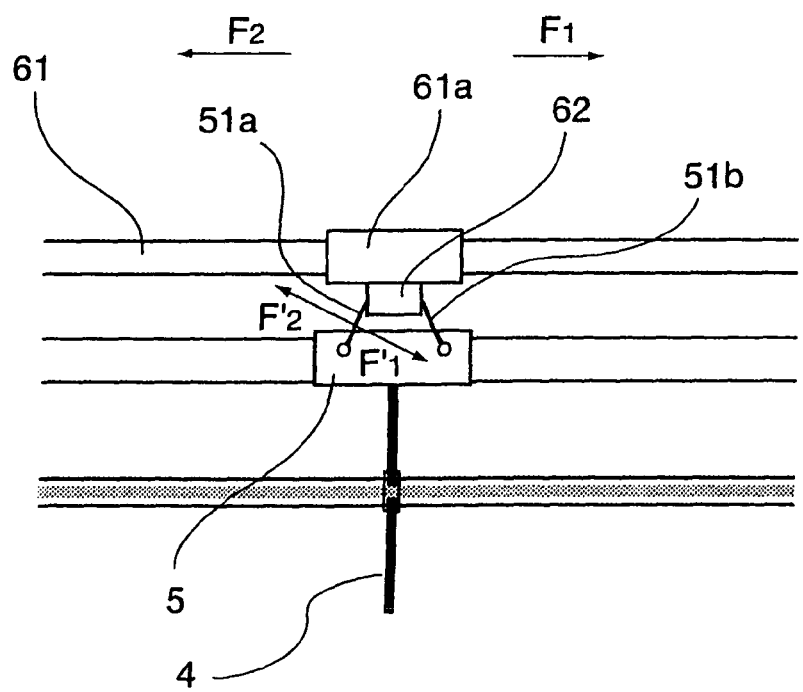
FIG. 2 shows a detailed view of automatic attachment and detachment means for a disinfecting device according to the invention.

The means for automatic attachment and detachment of the carriage 5 to the drive means are illustrated in more detail in FIG. 2.

With reference to FIG. 2, the carriage 5 carries two inclined springs 51a, 51b extending from the carriage. These springs 51a, 51b together define a space within which the transverse rod 62 supported by the actuators 61 is inscribed.

The automatic attachment and detachment functions will be described in more detail with reference to the operation described below.

Assuming that the carriage 5 is not attached to the drive means 6, when the rod 62 moves in the direction indicated by the arrow $F_1$ (from the left in FIG. 2), the rod 62 comes into contact with the spring 51a and constraints the spring 51a to bend as indicated by the arrow $F'_1$.

The rod 62 then stops in contact with the spring 51b while the spring 51a returns to its initial position, the rod 62 then being inscribed in the space defined by the two springs 51a and 51b.

Thus, due to the stiffness of the springs 51a and 51b, the carriage 5 is fixed to the rod 62. Assuming that the scraper 4 is blocked and creates a resistance greater than the stiffness of one of the springs 51a, 51b, the rod 62 driven by the mobile device 61a is provided with actuators 61 (for example along the direction indicated by the arrow $F_2$) and forces the corresponding spring (in this case spring 51a) to bend as shown by arrow $F'_2$, until the rod 62 comes out of its housing.

The drive means may also continue moving, the carriage 5 supporting the scraper 4 in the blocking situation remaining fixed.

It will be noted that the travel distance of the actuators 6 is greater than the length of the beams 1. The actuators 61 can thus take the rod 62 beyond the end of the beam 1. Thus, all the springs trip at the same location, so that modules are released. The modules may then be disassembled and taken out of channel since the rod 62 is no longer above the modules. When starting again, the springs move themselves into the working position the first time that the rod 62 passes above the modules.

The invention claimed is:

1. An ultraviolet wastewater or water treatment system for disinfecting the wastewater or water by ultraviolet radiation, the system comprising:
   a. a series of lamp modules forming a bank, each lamp module containing a plurality of ultraviolet lamps each having a longitudinal axis, each lamp having a protective cladding, made of a material transparent to ultraviolet light, disposed thereon;
   b. a common drive assembly including:
      i. a common drive;
      ii. first and second actuators extending generally parallel to the longitudinal axes of the lamps;
      iii. first and second mobile devices operatively connected to the first and second actuators respectively and to the common drive, and wherein the first and second mobile devices are movable back and forth along the first and second actuators respectively in a direction generally parallel to the longitudinal axes of the lamps;
      iv. a transverse rod extending between the first and second mobile devices and extending generally perpendicular to the first and second actuators, wherein the transverse rod is operatively connected to the first and second mobile devices and is movable in a direction generally parallel to the longitudinal axes of the lamps;
   c. a series of elongated beams for supporting the lamp modules, each beam being disposed over one of the modules and extending generally parallel to the longitudinal axes of the lamps and extending generally perpendicular to the transverse rod;
   d. a plurality of carriages, each carriage being movably mounted on one of the beams and configured to be operatively connected to the transverse rod such that as the transverse rod moves, each carriage connected to the rod moves back and forth along one of the beams;
   e. a plurality of scrapers, each scraper carried by and extending downwardly from one of the carriages for engaging and cleaning the protective cladding of the plurality of lamps in one of the modules as the carriages move back and forth along the beams; and
   f. wherein the common drive is operable to move the first and second mobile devices back and forth along the first and second actuators, and wherein as the first and second mobile devices move relative to the actuators, the transverse rod and at least one of the carriages and its respective scraper moves in the same direction as the mobile devices.

2. The ultraviolet wastewater or water treatment system of claim 1 wherein the common drive is supported independently of the ultraviolet lamp modules.

3. The ultraviolet wastewater or water treatment system of claim 1 including an automatic attachment system for automatically attaching and detaching the common drive to at least one of the carriages.

4. The ultraviolet wastewater or water treatment system of claim 3 wherein the automatic attachment system includes at least two springs associated with each carriage.

5. The ultraviolet wastewater or water treatment system of claim 4 wherein the springs extend upwardly from each carriage in converging directions.

6. The ultraviolet wastewater or water treatment system of claim 5 wherein the transverse rod extends between the springs.

7. The ultraviolet wastewater or water treatment system of claim 3 wherein the automatic attachment system is configured to detach the common drive from the at least one of the carriages if the carriage or its respective scraper encounters a predetermined resistance to movement as the carriage moves along its respective beam.

8. The ultraviolet wastewater or water treatment system of claim 1 wherein the first and second actuators are disposed on opposite sides of the bank of lamps.

* * * * *